(12) United States Patent
Wilcox

(10) Patent No.: US 6,244,389 B1
(45) Date of Patent: Jun. 12, 2001

(54) LUBRICATION VENT BLOCK

(76) Inventor: William Stanley Wilcox, 72 Richmond Cresent, Stoney Creek, Ontario (CA), L8E 5T9

(*) Notice: Subject to any disclaimer, the term of this patent is extended or adjusted under 35 U.S.C. 154(b) by 0 days.

(21) Appl. No.: 09/342,194

(22) Filed: Jun. 29, 1999

(51) Int. Cl.$^7$ .................................................. F01M 11/00
(52) U.S. Cl. ............................................................ 184/105.3
(58) Field of Search ............................ 184/79, 59, 103.1, 184/105.1, 105.2, 105.3, 29; 137/517, 14

(56) References Cited

U.S. PATENT DOCUMENTS

| | | |
|---|---|---|
| Re. 35,842 * | 7/1998 | Ehlert .................................. 184/6.26 |
| 1,805,303 | 5/1931 | Barks . |
| 1,961,051 | 5/1934 | Kearns .................................... 184/7 |
| 2,007,169 * | 7/1935 | Kerns .................................... 184/7.3 |
| 2,283,638 | 5/1942 | Klein et al. .............................. 184/7 |
| 2,720,283 * | 10/1955 | Lares .................................. 184/105.3 |
| 2,938,756 * | 5/1960 | Loes .................................. 184/7.3 X |
| 3,642,020 | 2/1972 | Payne ................................... 137/112 |
| 3,687,153 | 8/1972 | Gold .................................... 137/112 |
| 3,747,626 * | 7/1973 | Valentino . |
| 3,756,349 * | 9/1973 | Klüh .................................. 184/105.3 |
| 3,963,047 * | 6/1976 | Moring .................................. 137/596 |
| 4,448,211 | 5/1984 | Yoshida ................................. 137/112 |
| 4,452,188 | 6/1984 | Kosuda et al. ....................... 123/90.18 |
| 4,467,825 | 8/1984 | Boyd .................................... 137/112 |
| 4,589,524 * | 5/1986 | Laycock ............................. 184/103.1 |
| 5,449,051 | 9/1995 | Liao .................................... 184/55.1 |
| 6,079,519 * | 6/2000 | Lottes .................................. 184/105.1 |

* cited by examiner

Primary Examiner—Rodney H. Bonck

(57) ABSTRACT

There is provided a lubrication vent block for use in managing lubrication in a lubricated device, the lubrication vent block comprising: a receiver, to receive lubrication from an external source, a venter, to vent lubrication from the lubricated device, a common conduit, fluidly connected to the receiver and venter, to provide a path for lubrication to flow into and out of the and a valve, located between the common conduit and venter and receiver, for controlling the passage of lubrication through the lubrication vent block to the lubricated device, wherein, upon lubrication being received by the receiver, the valve directs the lubrication to the lubricated device, and wherein, upon an excess of lubrication arising in the lubricated device, the excess lubrication passes through the common conduit to the venter.

22 Claims, 11 Drawing Sheets

LUBRICATION VENT BLOCK

FIELD OF THE INVENTION

This invention relates generally to the field of lubrication, and more particularly to a system for managing lubrication in a lubricated device such as a bearing block.

BACKGROUND OF THE INVENTION

Lubricated devices are a pervasive and necessary component of modern machinery. In industrial applications, lubricated devices in the form of relubricatable bearing blocks (also called "bearing units" or just "bearings") are often used. These devices generally require regular re-lubrication to operate efficiently. In practice, bearings are often over-lubricated beyond the manufacturer's recommended maximum. This is a problem, because over-lubrication can cause the generation of excess heat, inefficient operation, and possibly complete failure of the bearing. Bearing failure can be very costly, as it involves not only replacement or repair of the bearing and any related damaged equipment, but also production downtime. Accordingly, it is critical to manage the amount of lubrication present in relubricatable bearings to reduce the risk of premature and spontaneous bearing failure.

Most industrial grade bearings comprise a housing with a central bore, into which is inserted a radial bearing having a smaller, inner bore. The radial bearing has an outer ring fixed to the outer bore of the housing, and an inner ring that attaches to and rotates with the shaft being operated. Between the rings is a cage separator containing rolling elements such as balls or rollers. Lubrication injected into the radial bearing provides a low-friction surface for the rolling elements and rotating inner ring. There is also a seal or other enclosure, usually made of rubber, in the shape of a ring whose outer edge attaches to the outer bore and whose inner edge rides the shaft. The seal keeps lubrication in, and external contaminants such as moisture, dust, or other airborne particles, out of the radial bearing.

There is a conduit in the housing to permit injection of externally supplied lubrication into the radial bearing. Stand-alone or independent bearings commonly have a standard ZERK™ fitting to accept a grease gun. Relubrication of such bearings accordingly requires specific, periodic attention by maintenance personnel. Bearings that are part of central lubrication systems, where a group of bearings receive electronically controlled grease injections, have a permanent connection to a grease input line. While these bearings do not require specific individual attention, a sophisticated electronic system to control the injection of fresh grease is usually needed.

When a bearing starts up, it generates heat that liquefies the grease. An oil separation layer is created that allows the rolling elements to spin with minimal metal-to-metal contact, and stabilizes the temperature inside the radial bearing. However, if the bearing is over-lubricated, there is a churning effect that generates excess heat. This can cause the internal components to expand, leading to more metal-to-metal contact and generation of more heat. In that case the temperature may fail to stabilize, and could rise to the point where it breaks down the oil separation layer, causing the bearing to fail, or seize up.

Bearing failure can also be exacerbated by the presence of contaminants that enter the bearing through gaps in the seal. Gaps can occur due to wear and tear, an imperfect fit between the seal and bearing, or from the stress imposed by the build-up of pressure inside the bearing. Since over-lubrication of the bearing raises internal pressure, it may cause lubrication to leak out under pressure through the gaps, and may expand the gaps themselves. Further, external contaminants can get actively sucked in if there is a rapid drop in pressure inside the bearing. This can happen, for example, if a hot bearing is cooled down rapidly by a water spray, rather than allowed to gradually cool down on its own. The bearing components shrink as they cool, creating a vacuum and drop in pressure.

A bearing can fail quickly if there is a large rise in pressure which "blows-out" the seal, for example, by using a high pressure grease gun. A blow-out creates a large hole in the seal, causing a rapid loss of lubrication and ingress of contaminants. Bearing failure can also occur by a slower process of attrition, especially if there is over-lubrication. For example, gaps in the seal may allow some grease to leak out on start-up, and some contaminants to enter, causing incremental deterioration of the bearing. Too rapid a cool-down may draw in more contaminants. The process may repeat over several cycles of start-up and cool-down, until the bearing fails. However bearing failure occurs, it is clear that over-lubrication of the bearing can be a major factor, due to the rise in heat and pressure, and possible leakage of lubrication that it causes.

Even though over-lubrication is a recognized cause of bearing failure, it can be difficult to avoid in practice on the factory floor. One reason is that many operators are by inclination more concerned about the risk of inadequate lubrication, and so are predisposed to keep adding grease. Also, the initial rise in temperature that occurs on start-up, while conventional and not damaging, may be misunderstood by maintenance personnel, who unnecessarily inject more lubrication into the bearing to ensure that it is adequately lubricated. Another type of problem is that operators who are aware of this issue may refrain from adding grease to a bearing whose lubrication level is unknown, such as a bearing brought out of storage or repair. Ironically, these bearings may have too little grease to function properly, and could fail for that reason. Over-lubrication is therefore a persistent problem that is difficult to avoid, even by knowledgeable operators who intend to take every possible precaution.

These problems have not been addressed by the prior art, most of which is directed to the limited issue of controlling the amount of lubricant being provided in a given injection. For example, U.S. Pat. No. 2,283,638 to Klein is directed to a lubrication injector. This device teaches that a metered amount of lubricant can be injected into the bearing. Another patent is Kerns, U.S. Pat. No. 1,961,051, which is directed to a lubricating device which can be operated to fill one side of a valve, and then the other side of the valve, to provide a metered flow of lubrication to a bearing. Similarly, some central lubrication systems, using sophisticated electronic controls, try to resolve the problem by dispensing measured amounts of lubrication at regular intervals. However, this approach is ineffective because the amount of lubricant injected can only be an estimate of the amount that, it is assumed, may have leaked out in the preceding interval. Over-lubrication can occur through repeated injection of measured amounts, just as it can occur by a single injection of an excessive amount. In addition, the electronic controls required for this approach are complicated and prone to breakdown.

Another approach used by some central lubrication systems is to run a vent line from each radial bearing to a central manifold. However, since this line is open at all times, newly injected fresh grease will often get vented out rather than remain in the radial bearing. Accordingly, the bearings in this system can be deprived of fresh grease and deteriorate at a faster rate.

In the absence of any overall system to manage the flow of lubrication, the risk remains that excess lubrication will continue to be injected into bearings, causing further breakdowns.

SUMMARY OF THE INVENTION

What is desired is a lubrication control system that manages or regulates the amount of grease in a lubricated device such as a bearing throughout the cycle of operation. Ideally, the lubrication control system would safely vent any excess grease present at start-up or at any time during operation, and draw back in grease, and not atmospheric contaminants, if there is a vacuum created when the bearing is shut down and cooling off. The lubrication control system should be easily integrated with bearing blocks currently in use so that there would be no need for expensive retrofitting or replacement. It would also be advantageous for the lubrication control system to be connected to a source that contains clean grease, so that the grease that is vented from and into the bearing block would not be mixed with and contaminated by airborne particles.

In accordance with the present invention, there is provided a lubrication vent block for use in managing lubrication in a lubricated device, the lubrication vent block comprising: a receiving means, to receive lubrication from an external source, a vent means, to vent lubrication from the lubricated device, and a valve means, for controlling the passage of lubrication through said lubrication vent block to said lubricated device, wherein, upon lubrication being received by said receiving means, said valve means directs said lubrication to the lubricated device, and wherein, upon an excess of lubrication being received by the lubricated device, said excess lubrication may be directed out of said lubricated device to said vent means by said valve means.

In a further embodiment of the present invention, there is added a second valve means biased to block the flow path through the vent means when the lubricated device is not operating or in balanced operation.

In a further embodiment of the present invention, there is added means for integrating the lubrication vent block into the construction of the lubricated device such as a bearing block, so it would not need to be connected as an external attachment.

In a further embodiment of the present invention, there is added means for connecting multiple lubricated devices such as bearing blocks to a single lubrication vent block, so that more than one bearing block could receive grease through injection into a single grease input, and so that a single lubrication reservoir could accept vented grease from multiple bearing blocks.

DETAILED DESCRIPTION OF THE PREFERRED EMBODIMENTS

Figure 1:
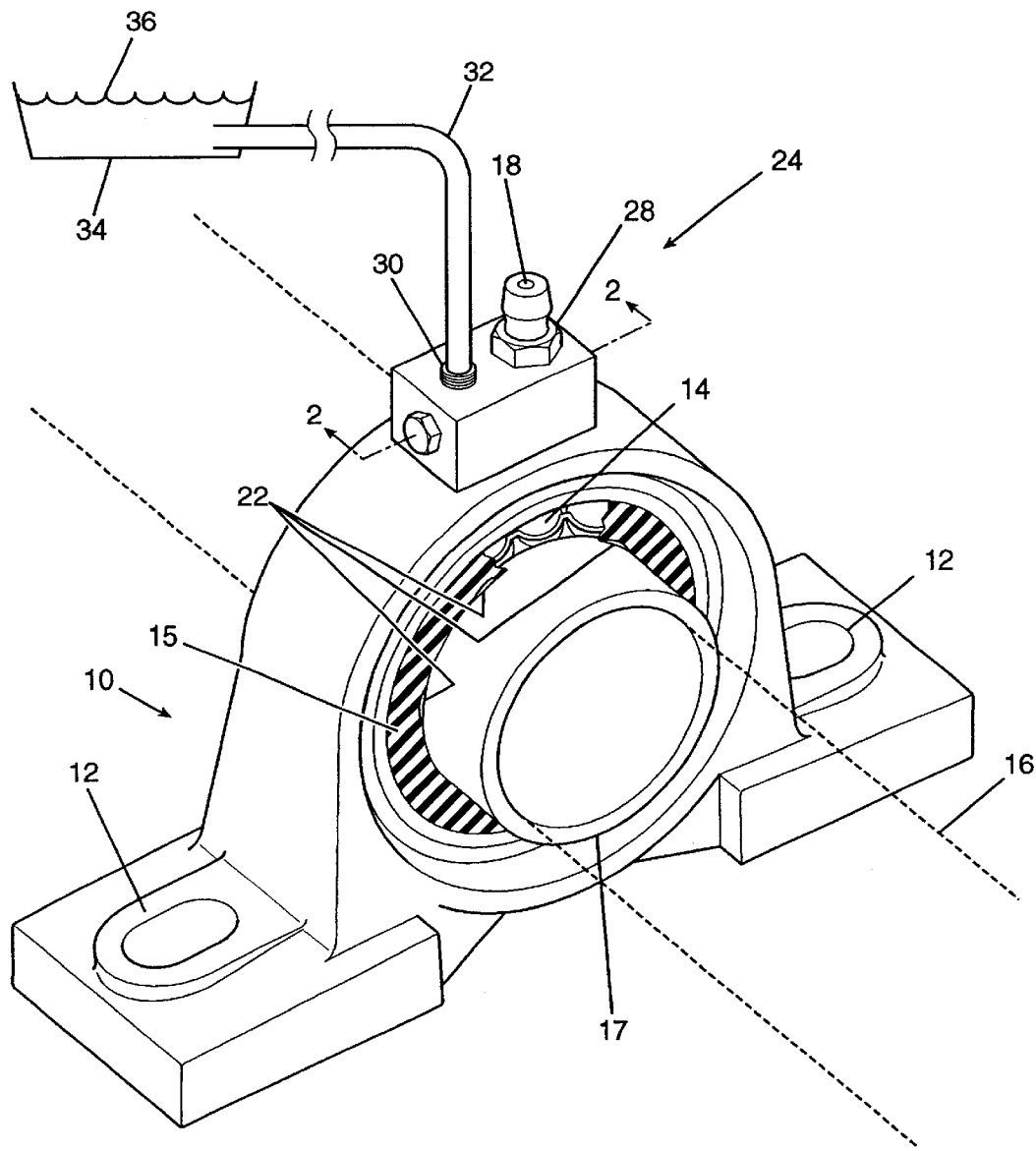
FIG. 1 is a perspective view of a lubrication vent block in accordance with the present invention, positioned in connection with a representative bearing block.

An overview of the present invention, and its integration with a lubricated device such as a bearing block, is shown in FIG. 1. For added clarity, FIG. 1a shows the same view as FIG. 1 but with the present invention separated from the bearing block.

Figure 1A:
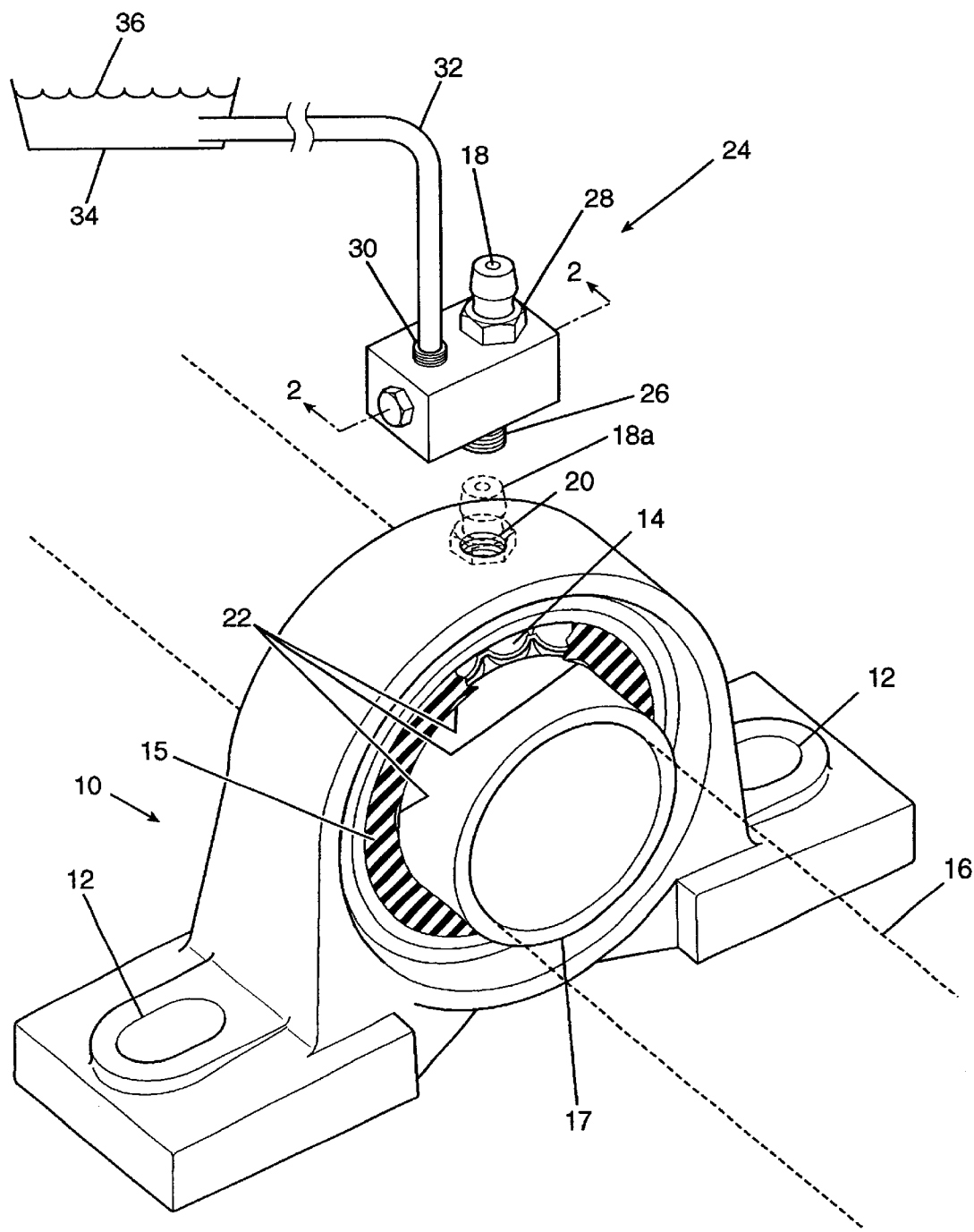
FIG. 1a is the same view as FIG. 1, with the lubrication vent block shown in a position separate and apart from the representative bearing block.

A bearing block 10 shown in FIGS. 1 and 1a is a representative example of the bearing blocks or units in common use. The bearing block 10 may be clamped onto a fixed surface through bolts inserted in holes 12. A radial bearing 14 is centred in the block 10, and encircles a bore through which a shaft 16, shown in outline form, may be inserted. The radial bearing 14 includes an inner ring extension 17, and is covered by a seal 15 that insulates the rolling elements and lubricant from the external environment. The drawings show the seal 15 made of rubber, however metal seals are also used. The inner ring extension 17 is the only part of the radial bearing 14 that projects outside the seal. In FIGS. 1 and 1a a section of the seal 15 has been cut out for illustration purposes, to enable the otherwise hidden rolling elements and cage separator of the radial bearing 14 to be seen. Not shown in FIGS. 1 and 1a is a metal protector, commonly called a "flinger", that in many bearings rides with the shaft and protects the seal from environmental or mechanical damage. It will be appreciated that this particular bearing configuration, with an inner ring extension and metal flinger, is representative of only one type of bearing block to which the present invention applies. The lubrication vent block of the present invention is applicable to any relubricatable bearing system, regardless of configuration.

As shown in FIG. 1a, the radial bearing 14 in a conventional bearing block receives injections of fresh grease, or lubricant, through a representative grease fitting 18a, shown in outline form, which is screwed into a threaded housing 20 that is built into the bearing block 10. The grease fitting 18a will accept a grease gun, if used with a stand-alone bearing, or a feed line if used with a central lubrication system. Also shown are gaps 22. The gaps could be any type of clearance, crack, open space, or seepage point within the seal 15 or between the seal 15 and adjacent elements of the bearing block. In practice, the gaps 22 are most likely to be clearances between the seal 15 and shaft 16 that result from a seal that is damaged, poorly fitted, or worn by excessive use.

In the representation of a conventional bearing block system shown in FIG. 1a, the grease fitting 18a is the only structured external connection between the radial bearing 14 and the outside environment. As shown in more detail below, this connection operates one-way only, so that grease can enter the block through this path but cannot leave. The gaps 22 provide a two-way, but highly unstructured path through which grease or other particles may pass.

A lubrication vent block 24 comprising the present invention is also shown in FIGS. 1 and 1a. The lubrication vent block 24 is shown as having three external connections, or connection means, each of which is embodied in the figures as a threaded housing. As shown in FIG. 1a, the lubrication vent block 24 as a whole connects to the bearing block through a first connection means, or output connector, shown as threaded housing 26, which connects with threaded housing 20 of the bearing block. As a result, the grease fitting 18 or 18a that would otherwise have connected directly to threaded housing 20 in a conventional system, is instead connected to threaded housing 28, which is a second connection means of the lubrication vent block 24. A third connection means, threaded housing 30 of the lubrication vent block 24 represents a third external connection, one that has no counterpart in the conventional bearing block system. As shown in FIGS. 1 and 1a, threaded housing 30 connects the lubrication vent block 24 to a vent line 32, that in turn connects to a lubrication reservoir 34 containing a supply of grease 36.

The body of the lubrication vent block 24 is most commonly constructed of metal or high impact plastic. However, it can be appreciated by someone skilled in the art that any durable material that can contain internal conduits and external connections to manage the flow of fluid may be used. The external connections, or connection means, may be any convenient connector that will accept a grease gun, feed line, or other grease input device, attach to a bearing block, or connect to an external vent line. For example, a "quick disconnect" or "snap-on" connector might be used to connect a grease gun. Threaded housings made of metal are typically used since they are the most common connectors currently in use. The vent line 32 may be a hollow plastic tube connected by an adaptor to the threaded housing. It can also be appreciated that in a multiple bearing block system, a central lubrication system that employs a common grease source and a common lubrication reservoir may be used instead of dedicated devices or lines.

The lubrication reservoir 34 shown in all the figures broadly represents that the vent line 32 will often, at some point in the life of the bearing, contain some lubrication or grease 36. This could occur because, when the bearing is in a state of over-lubrication excess grease 36 will be expelled through the vent line 32. There is no requirement in the present invention that there be any actual physical element or reservoir at the end of the vent line 32. In one embodiment of the present invention, the vent line 32 can simply terminate as an open line. In that case, the vent line 32 is also the lubrication reservoir 34. Alternatively, the lubrication reservoir 34 could represent a separate physical container capable of holding grease, such as a bucket or catch basin, placed at the termination of vent line 32. In that case, the terminal end of vent line 32 could be placed above the body of grease, or within it, as shown in the figures. In a central lubrication system, the lubrication reservoir 34 could represent the common lubrication reservoir is shared by the bearings on the system.

A more detailed view of the internal structure of lubrication vent block 24 is shown in FIGS. 2 to 5. The view is taken along line 2—2 in FIG. 1. The same view of a different embodiment of the present invention is shown in FIGS. 7 to 10.

In each of FIGS. 2 to 5 the elements of lubrication vent block 24 previously described may be seen. These include the connection means, threaded housing elements 26, 28, and 30, which connect the lubrication vent block 24 with the bearing block 10, grease fitting 18, and vent line 32 respectively.

FIGS. 2 to 5 also reveal a number of conduits internal to the lubrication vent block 24. The conduits provide for the passage of fluid from one end to the other under pressure or gravity. A first conduit, or pressure grease conduit 38 connects with grease fitting 18. A second conduit, or vent conduit 40 connects to the vent line 32. The pressure grease conduit 38 and vent conduit 40 are joined by a valve conduit 42. The valve conduit 42 in turn connects with a bearing block or common conduit 44, which provides a flow path into the bearing block 10.

It can be appreciated by a person skilled in the art that while the preferred embodiment of the invention uses four internal conduits, other implementations are also possible. It will be appreciated that the preferred configuration provides that grease be admitted through a receiving means, transmitted to a bearing under the control of a valve means, and be permitted to flow in and out through a vent means, for example to a reservoir, under the control of the valve means, and that the particular structure employed, whether by a conduit or some other configuration, does not matter as long as the essential functions are provided.

In the preferred embodiment of the invention, the receiving means generally comprises a conduit to receive the lubrication, but it will be understood by those skilled in the art that the receiving means could take many forms, provided it functioned to receive lubrication. For example, in the preferred embodiment the receiving means comprises the first conduit, or pressure grease conduit 38, and may also include the second connection means of threaded housing 28. The vent means similarly comprehends any structure which permits expressing or venting of excess lubrication. For example, the vent means comprehends the second conduit, or vent conduit 40, and may also include the third connection means, threaded housing 30. The vent means may further comprehend the vent line 32 and lubrication reservoir 34. The valve means comprehends any structure which can selectively open or close to permit passage of lubrication, and for example comprehends the valve conduit 42, and any components occupying said valve, such as valves or coil springs. The valve means may further comprehend the bearing block conduit 44 and first connection means, or output connector, threaded housing 26.

In the preferred embodiment of the invention, all of the internal conduits are free of obstruction except for the valve conduit 42, which contains a first valve member, shown in the figures as a floating piston 46. The first valve member acts as a one-way valve, allowing lubricant to be injected from the grease fitting 18 through the pressure grease conduit 38 into the system, but preventing any flow of fluid in the reverse direction. In essence, the pressure grease conduit 38, floating piston 46, and bearing block conduit 44 together replicate the functionality of the conventional bearing block system in which there is only one conduit, allowing only a one-way flow of grease to the bearing block 10.

Figure 2:
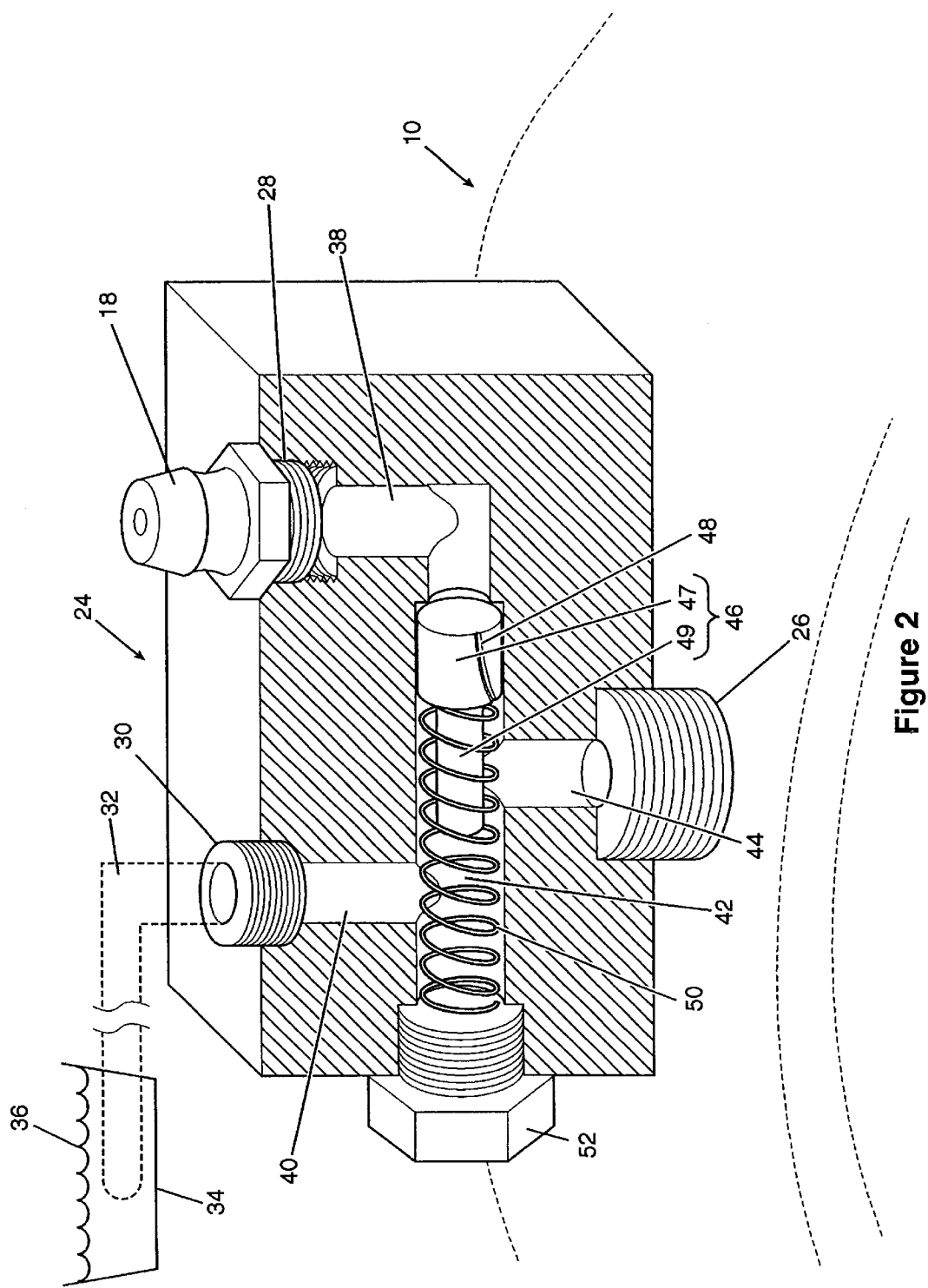
FIG. 2 is a cross-sectional view along line 2—2 of FIG. 1, showing the lubrication vent block in a neutral position.

In FIG. 2, the first valve member or one-way valve shown as floating piston 46 fits closely within the valve conduit 42, and is sized and shaped to move easily within the conduit. The floating piston 46 may be constructed from any hard, durable, corrosion and heat resistant material such as stainless steel or plastic. The floating piston 46 is shown with a piston head 47 and a piston shaft 49. The piston head 47 is sized and shaped to move easily within the conduit. The piston shaft 49 provides guidance so that the floating piston 46 avoids getting skewed or jammed as the piston moves back and forth within the conduit. The piston shaft 49 is also desirable to support a further valve, as discussed in more detail below.

As a further measure to minimize the risk that the floating piston 46 will jam or experience hydraulic lock, a bleed means in the form of a small bleed groove 48 is shown carved into one edge of the piston head 47. It can be appreciated that other means of avoiding hydraulic lock can also be used. For example, a capillary tube or small drill hole may be used to connect the pressure grease conduit 38 with the bearing block conduit 44 where it bolts into the housing.

A first biasing means, shown in the form of an elastically deformable element, coil spring 50, connects the floating piston 46 with a fixed surface, the opposing inner wall of the lubrication vent block 24, and biases the floating piston 46 so that, when no other force is present, the floating piston 46 rests in a first position, against the far right edge of the valve conduit 42. In that first position the floating piston 46 blocks the flow path through the pressure grease conduit 38.

As shown in FIGS. 2 to 5, a removable end plug 52 may be used to form the fixed surface at one end of the valve conduit 42. In that case the coil spring 50 could connect to the removable end plug 52, rather than an internal wall of the lubrication vent block 24. The benefit of using a removable end plug 52 is that when removed, access may be obtained to the otherwise inaccessible valve conduit 42, allowing maintenance and cleaning to be performed. Additionally, a lock nut may be used with removable end plug 52 so that the tension of coil spring 50 may be easily adjusted without having to remove the plug and replace the spring.

Operation of the lubrication vent block 24 can now be described, with reference to FIGS. 2 to 5.

FIG. 2 shows the lubrication vent block 24 in a neutral, or steady-state position that occurs when the machinery employing the bearing block 10 is not operating, or is in balanced operation. In this position the floating piston 46, urged by coil spring 50, rests in its first position against the interface with pressure grease conduit 38.

Figure 3:
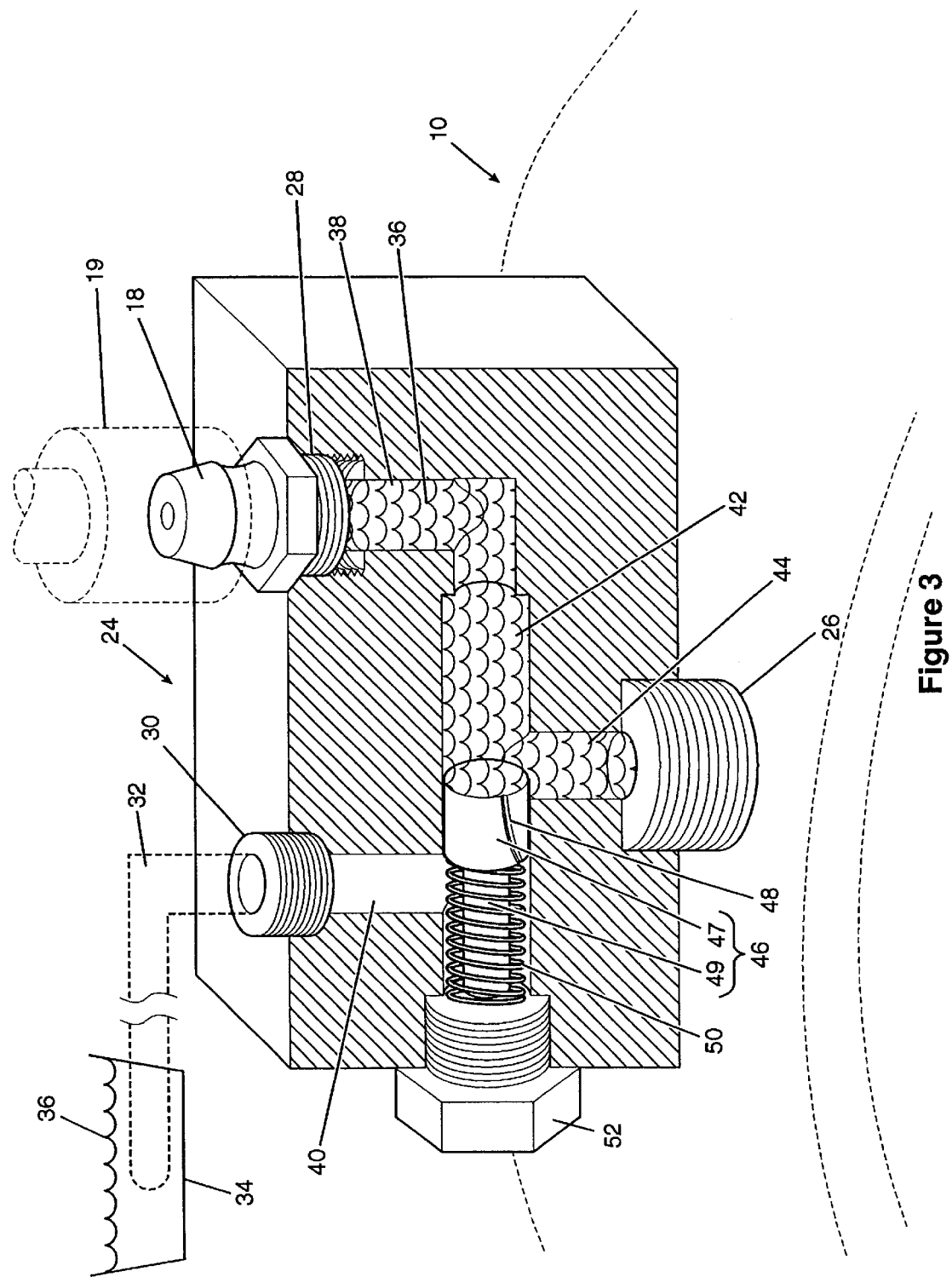
FIG. 3 is the same view as FIG. 2, in a lubricant injection position.

FIG. 3 shows the lubrication vent block 24 when grease 36 is injected from an outside source, shown in outline form as grease source 19, through grease fitting 18. This injection may occur at any time, regardless of whether the bearing block 10 is at rest or in operation, or if it is cold or hot. The injection of grease applies a certain pressure through grease fitting 18. As depicted in FIG. 3, the applied pressure in the conduit opposes and overcomes the bias imposed by coil spring 50. This causes the floating piston 46 to move away from the interface with the pressure grease conduit 38, and rest in a second position, at the interface with the vent conduit 40, blocking that conduit. The injected grease 36 is then free to flow through the pressure grease conduit 38, the bearing block conduit 44, and into the bearing block 10. At the same time, floating piston 46 blocks any grease from escaping or entering the vent conduit 40. When the grease source 19 is removed, the bias imposed by coil spring 50 re-asserts itself and the floating piston 46 returns to its rest position, blocking the pressure grease conduit 38. In this manner the elements of the lubrication vent block 24 provide a one-way valve through the pressure grease conduit 38. It can now be understood that the valve means, comprising the valve conduit 42, floating piston 46, and coil spring 50, directs lubrication received by the receiving means, pressure conduit 38, into the bearing block.

Figure 4:
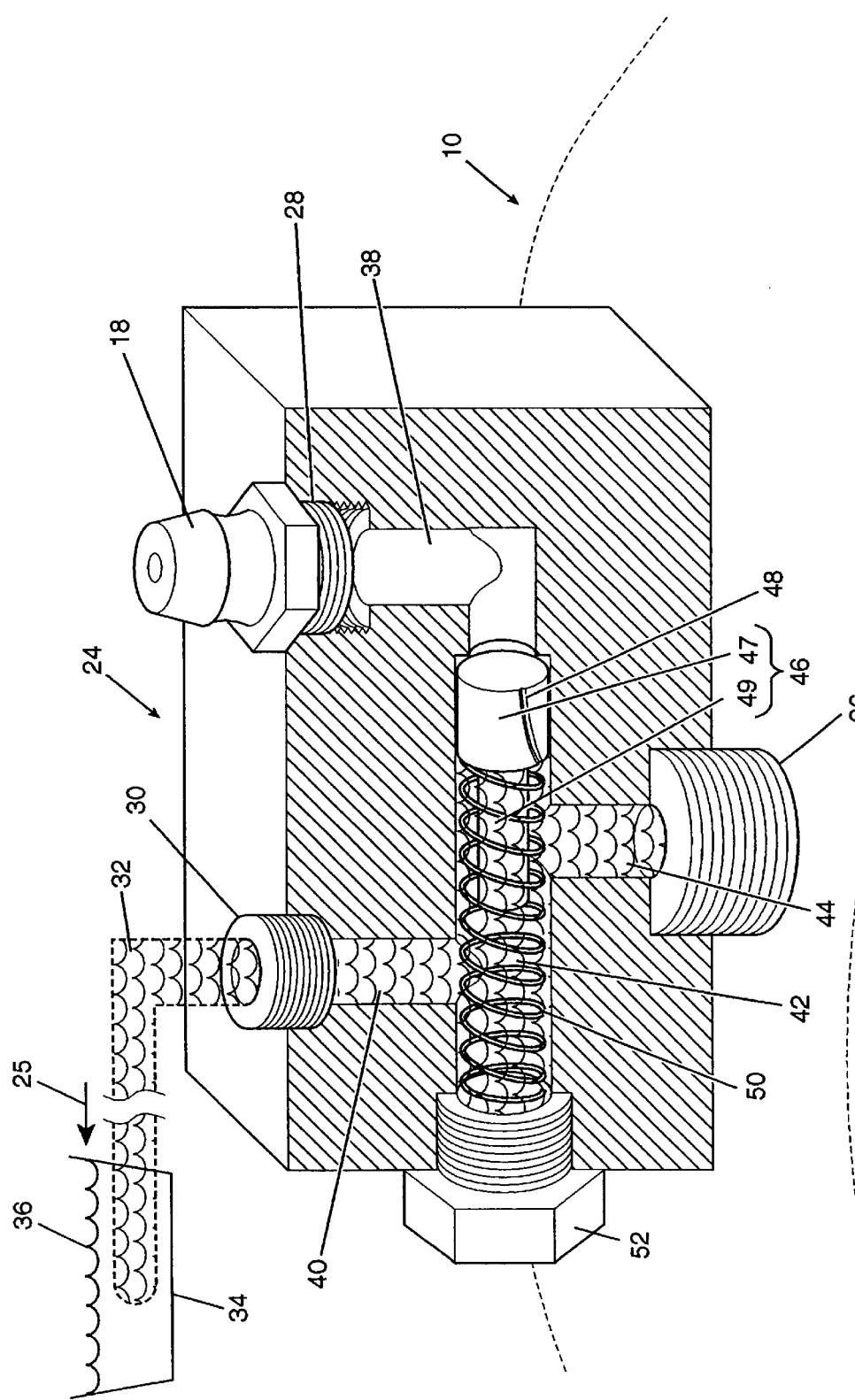
FIG. 4 is the same view as FIG. 2, where the bearing is in a state of over-lubrication.

In FIG. 4 the bearing block 10 is operating, hot, and in an over-lubrication condition. As discussed, the excess lubrication causes a churning effect and a corresponding rise in temperature and pressure. In a conventional bearing block, the pressure would be released by attempting to express the excess grease through the gaps 22 in the seal 15, as shown in FIG. 1, if the gaps are present in the system. If the gaps are not present, they may be created by this pressure, or, a blow-out may occur resulting in bearing failure. However, even if present, the gaps 22 rarely allow expulsion of ample amounts. Further, using gaps 22 to obtain needed venting is highly unsatisfactory because the grease is leaked in a messy and environmentally unsound manner, and is damaging to the seal 15. This is clearly contrary to the purpose of the seal 15, which is to keep grease inside the radial bearing, not allow it to escape.

These deficiencies with the conventional bearing block are addressed by the present invention. As shown in FIG. 4, the lubrication vent block 24 provides a low-resistance path for excess grease to flow out of the bearing block 10, in the direction shown by arrow 25, through the bearing block conduit 44 and vent conduit 40 and out through the vent line 32. Since this path offers low-resistance, the excess grease is more likely to flow through this controlled and environmentally sound path than it would be to leak out through gaps 22, if present. By venting excess grease in this way, excessive heat generation is avoided and there is no dangerous build-up of pressure. The risk of a blow-out of the seal 15 is greatly reduced, and the integrity of the seal 15 is preserved.

Generally, excess grease will be expelled immediately after it is injected, or upon the next start-up if the grease was injected when the bearing was cold. With the excess removed, the bearing should stabilize and maintain a steady-state operation for a reasonable time, as defined by the particular bearing's specifications. If in the interim there is a further excessive injection of grease then the expulsion process will repeat as described.

Figure 5:
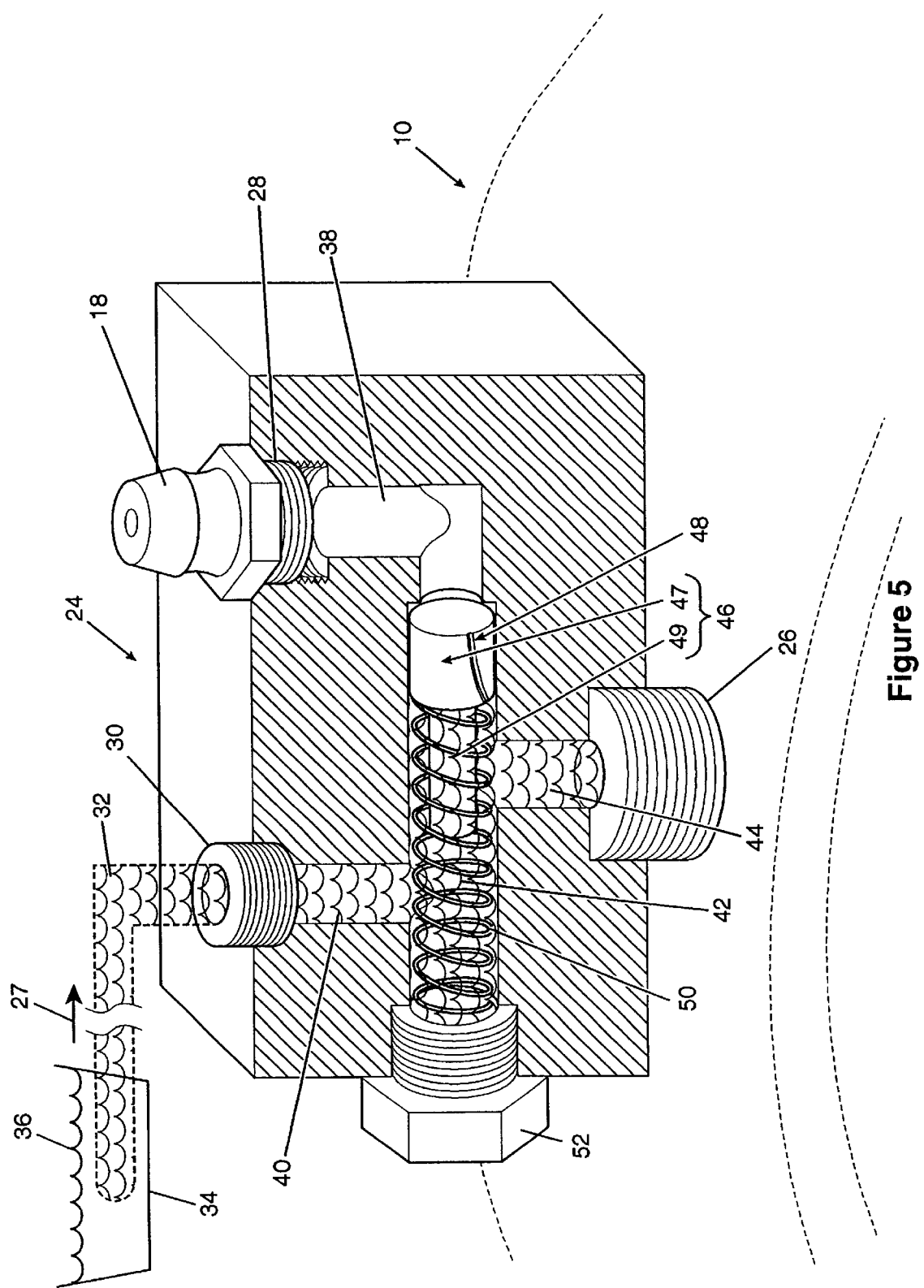
FIG. 5 is the same view as FIG. 2, where the bearing is cooling down.

FIG. 5 illustrates a parallel situation to that shown in FIG. 4. In this figure, the operating machinery has been shut off and the bearing block 10 is cooling down. As described, where the cooling down is rapid or the bearing block 10 has reached a particularly high temperature, there may be a negative pressure inside the bearing, or drop in internal pressure, and a partial vacuum created, drawing in fluid from the outside. In a conventional bearing block, the pressure imbalance created would again be relieved only through the gaps 22 in the seal 15 which, if present, would draw in water and other airborne particles that happen to be in the immediate environment. Again, the lubrication vent block 24 according to the present invention provides a low-resistance path for clean grease to be drawn into the bearing block 10, in the direction shown by arrow 27. Grease drawn from the vent conduit 40, or vent line 32, or external lubrication reservoir, as appropriate, would flow into the bearing through the vent conduit 40, valve conduit 42, and bearing block conduit 44. In general, the amount of fluid drawn in on cool-down is likely to be less than that expelled from over-lubrication. Nevertheless, it is desirable that this grease come from a controlled source and be as clean as possible, to minimize the amount of harmful contaminants that enter the bearing.

The availability of a low-resistance external path to which excess grease may be readily vented and from which clean grease may be readily drawn if there is a vacuum on cool-down represents a considerable improvement over the operation of the conventional bearing block. The risk of an undue rise in temperature or pressure, entry of contaminants, and ultimately, bearing failure, is greatly reduced by the controlled venting function performed by the present invention.

Another advantage of the present invention is that it provides, from the vent line 32 or lubrication reservoir 34, if they are connected, easily accessible samples of grease that can be analysed for purity. For example, the grease can be tested for the presence of oxidation, cage material, or other specific wear particles. This is an important practical benefit because over time, metal particles and other impurities can enter the grease, where they affect the performance of the bearing. In a traditional bearing block there is no equivalent sample source, and accordingly it is difficult to monitor the quality of the grease.

The lubrication vent block 24 shown in FIGS. 2 to 5 uses a single valve member that, as described, provides one-way access to the pressure grease conduit. Most of the time grease is not being injected, and the single valve means is biased to rest against the junction with the pressure grease conduit 38. As a result, there is an open path into the bearing block through the vent conduit 40 and bearing block conduit 44. Therefore, there is a possibility that contaminants may enter the bearing block from the outside. This is undesirable, as the internal elements of a bearing must have a positive mechanical seal separating them from the outside environment. Accordingly, it is necessary in this embodiment that the path through vent line 32 lead to a closed system. Accordingly, this embodiment of the invention is best used with central lubrication systems, since that type of system is already closed.

Figure 6:
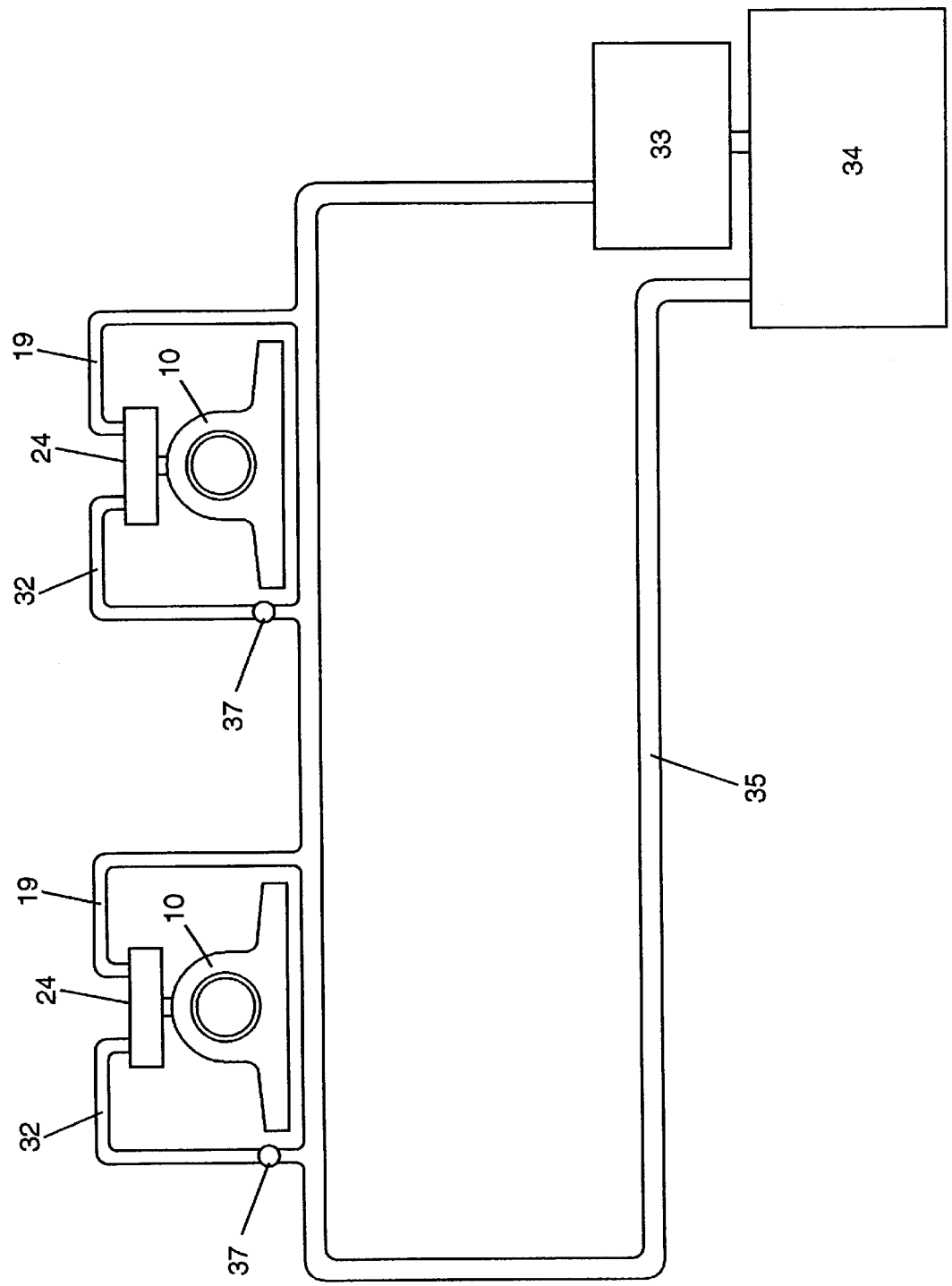
FIG. 6 shows the lubrication vent block used as part of a central lubrication system.

FIG. 6 shows the present invention used as part of a central lubrication system, using a representative sample of two bearing blocks 10. A pump 33 pumps grease drawn from the lubrication reservoir 34 through a main grease line 35. The main grease line 35 in turn feeds multiple grease sources 19, each of which feeds the lubrication vent block 24 servicing an individual bearing block on the system. In this case the grease source 19 would not be a grease gun, which requires manual operation by an attendant, but rather some sort of feed line configured to connect with the pressure grease conduit 38. The vent line 32 from each bearing block 10 connects back to the main grease line 35. There is a one-way valve 37 positioned on the vent line 32 which allows fluid to flow only in the direction from the lubrication vent block 24 to the main grease line 35. Fluid flow in the other direction is blocked. The central lubrication system shown in FIG. 10 accordingly has two lines going to each bearing block, a grease source line 19 and vent line 32. This contrasts with conventional central lubrication systems, which have only one feed line and no vent line.

In operation, the pump 33 pumps grease under pressure through the main grease line 35. Grease will accordingly flow under pressure through each of the grease sources 19 into the pressure grease channel 38 of each bearing block 10 in the system. Grease will not flow into the vent line 32 because of the presence of the one-way valve 37. If there is any excess grease in any bearing block it will be expelled, by the process described above, through vent line 32 into the main grease line 35, and eventually will return to the lubrication reservoir 34. If there is a negative pressure in any bearing, this will be most easily satisfied by the bearing drawing in grease sifting in the vent conduit 40 or vent line 32, rather than through any gaps in the seal.

It can now be seen that the lubrication vent block of the present invention manages the flow of lubrication through bearings connected in a central lubrication system so that the problems of over-lubrication and entry of contaminants through the seal are greatly reduced. This in turn lowers the risk of bearing failure. Additionally, since the present invention blocks the vent conduit 40 during greasing, it has the added advantage of ensuring that there is a positive feed of fresh grease into each bearing at all times. This overcomes the problem present in certain vented central lubrication systems, described above, where injected grease will simply flow out through the vent as soon as it is injected.

Yet a further benefit is that a central lubrication system of the type shown in FIG. 6 does not require the sophisticated metering system commonly required in current systems. Since there is a lubrication vent block 24 to manage the flow of lubrication through each bearing block, to vent any excess and allow for the ingress of clean grease automatically, there is much less danger of over-lubrication, and correspondingly much less of a need to monitor and regulate the volume of lubrication being injected to the same level of detail. Accordingly, a much simpler control mechanism may be used. For example, the pump 33 could operate from a simple periodic timer. Therefore, in addition to reducing the risk of bearing breakdown, the lubrication vent block of the present invention has the benefit of enabling use of central lubrication systems that are less costly to build and that are more reliable.

Another preferred embodiment of the present invention is shown in FIGS. 7 to 10. An aspect of this preferred embodiment is that it blocks the flow path between the vent conduit 40 and the valve conduit 42 when the bearing 3 is not operating, or is operating in a steady-state. As a result, there is a reduced risk of entry of unwanted airborne particles, and the lubrication vent block 24 can be used advantageously without concern as to whether the vent line 32 and lubrication reservoir 34 are part of an open or closed system. For this reason, this preferred embodiment of the lubrication vent block 24 is particularly well suited for use with larger, stand-alone bearing blocks. Of course, this preferred embodiment may also be used with central lubrication systems and other closed systems.

This preferred embodiment is similar to the preferred embodiment shown in FIGS. 2–5 above, except there is added to the valve means a second valve member that controls fluid flow through the vent means, or vent conduit 40. The second valve member has a neutral position and at least one offset position, and preferably has two offset positions. The second valve member is biased by a second biasing means to block access to the vent means, vent conduit 40, when the bearing is in a steady-state or neutral operation. When it is biased in this way, the second valve member is in the neutral position. The second valve member will shift to one or more offset positions in response to a pressure differential between the bearing block 10 and bearing block conduit 44 on one side, and the vent conduit 40 on the other side. This pressure differential will usually occur when the bearing is not in a steady-state or neutral operation, for example, when there is excess grease caused by a condition of over-lubrication in the bearing or when there is a negative pressure caused by the bearing rapidly cooling down. When the second valve member is in an offset position it does not block access to the vent conduit 40.

In FIGS. 7–10 the second valve member is shown as secondary piston 54, positioned in the valve conduit 42. The secondary piston 54 is shown in a preferred form as a sleeve that fits and slides on the piston shaft 49. The secondary piston 54 connects on one side to the removable end plug 52 through coil spring 50, and on the other side to piston head 47 by the second biasing means, a separate coil spring 51. It can be appreciated that the second valve member, or secondary piston 54, can be implemented using other means as long as it fulfills the function of blocking the path through the vent conduit 40 when the bearing is in a neutral or steady-state operation, and opening the path when the bearing is not in a neutral or steady-state operation.

Figure 7:
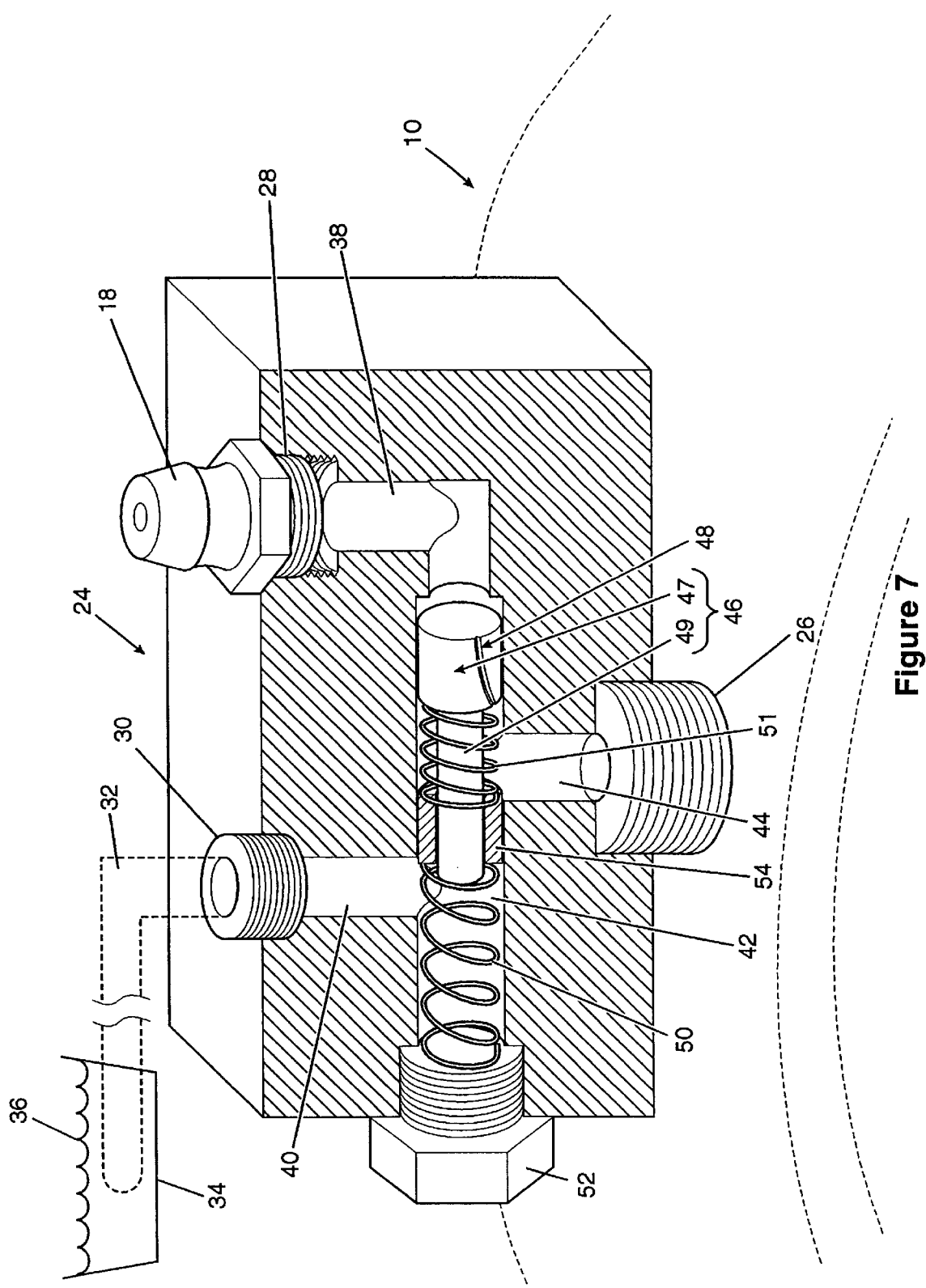
FIG. 7 is a cross-sectional view along line 2—2 of FIG. 1, showing the lubrication vent block in a neutral position, where the lubrication vent block contains a second valve member.
Figure 8:
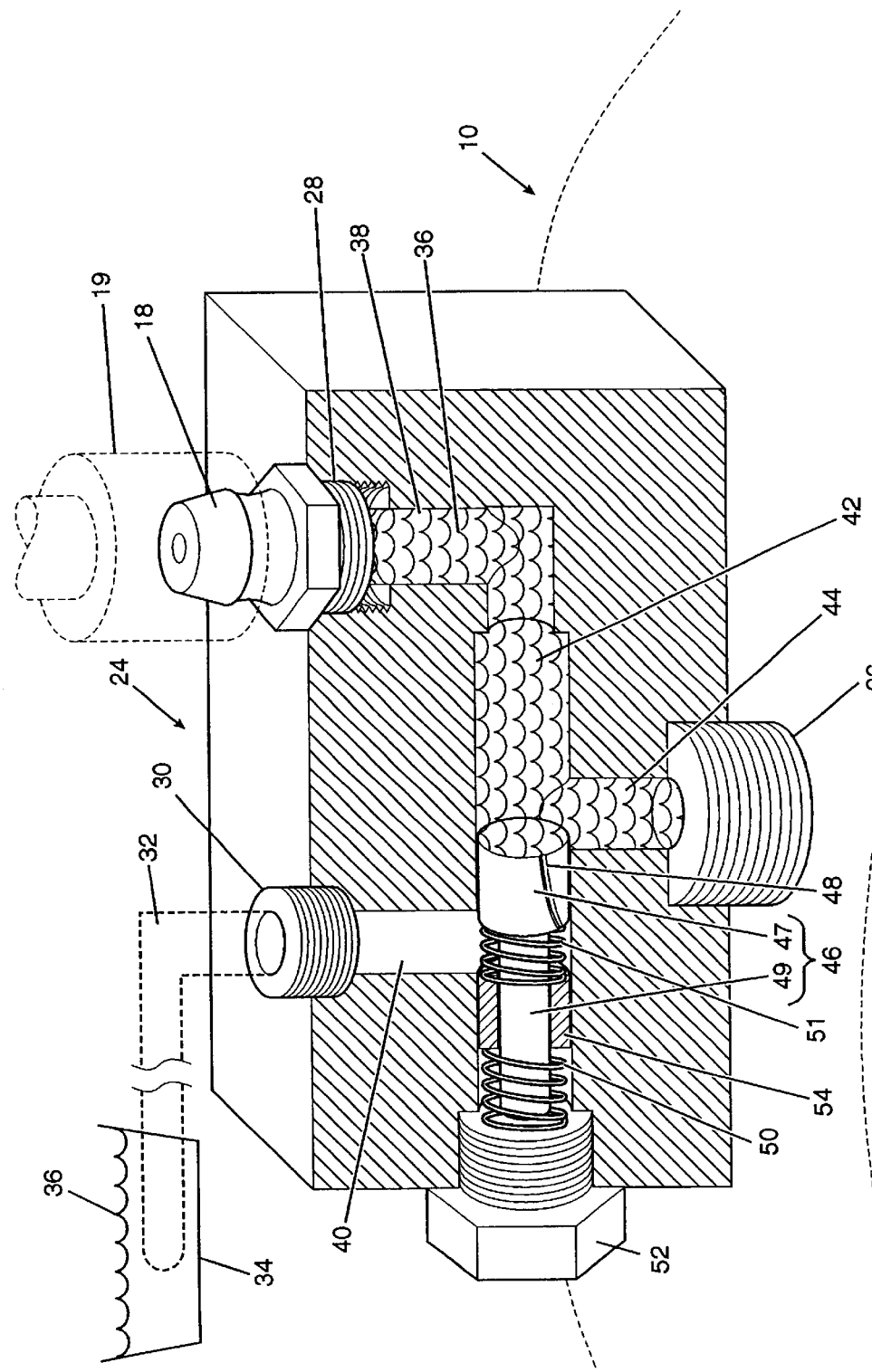
FIG. 8 is the same view as FIG. 7, in a lubricant injection position.
Figure 9:
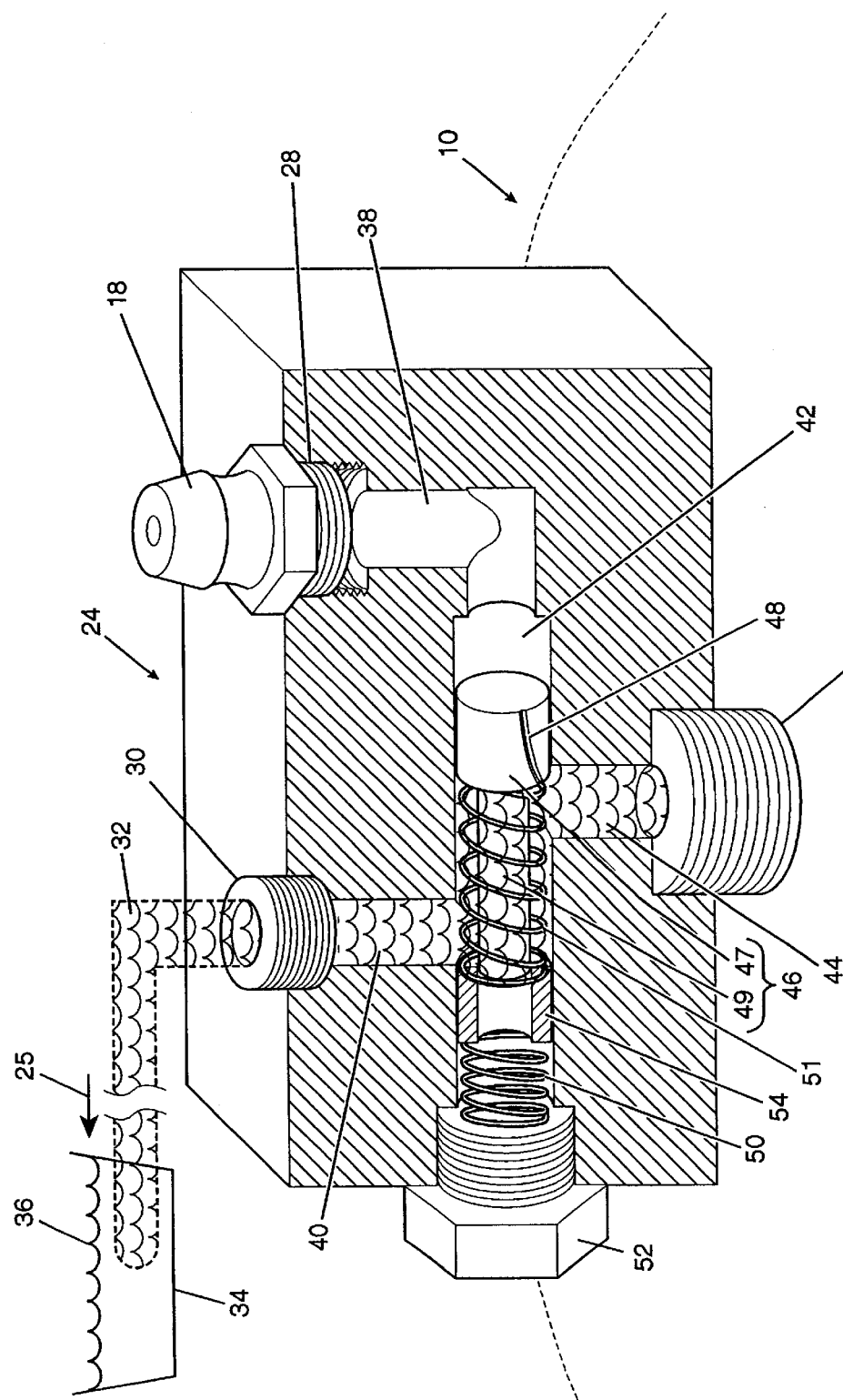
FIG. 9 is the same view as FIG. 7, where the bearing is in a state of over-lubrication.
Figure 10:
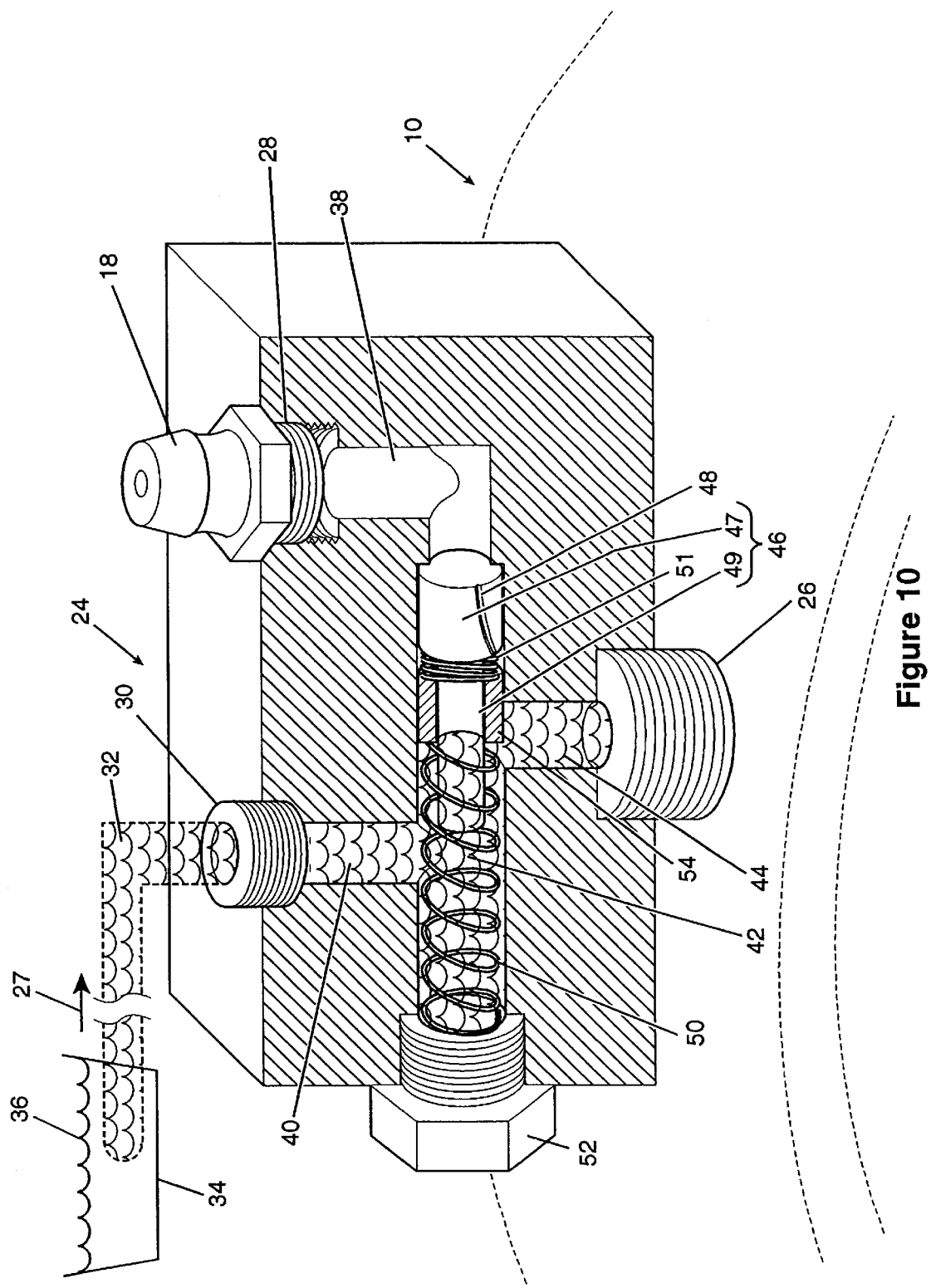
FIG. 10 is the same view as FIG. 7, where the bearing is cooling down.

FIG. 7 shows the bearing in neutral or steady-state operation, which occurs when the bearing is not in use, or when the bearing is operating and properly lubricated. In this case, the secondary piston 54 is biased in the neutral, or rest position, blocking access to the vent conduit 40. As shown in FIG. 8, when grease is injected through the grease fitting 18, the floating piston 46 blocks the vent conduit 40, as in the usual case. As shown in FIGS. 9 and 10, when there is either excess grease to be vented or a need to draw in grease on cool-down, the pressure differential between the bearing block conduit 44 and vent conduit 40 overcomes the bias on the secondary piston 54. This causes the secondary piston 54 to shift from its neutral or rest position, to an offset position, allowing grease to flow between the vent conduit 40 and bearing block conduit 44, in the direction indicated by arrows 25 and 27, in FIGS. 9 and 10, respectively.

More particularly, through the biases imposed by the coil springs 50 and 51, the secondary piston is configured so that when there is high pressure in the bearing block 10 due to over-lubrication, the secondary piston 54 is forced towards the removable end plug 52. Similarly, when the pressure in the bearing drops on cool-down, the secondary piston 54 shifts in the opposite direction, towards the pressure grease conduit 38. In either case it opens the path for grease to flow when needed, which is the desired result. In this regard it will be appreciated that the force required to move the secondary piston in either direction may be set according to the needs of the system, and need not be the same. The inflow and outflow of grease can occur at specific predetermined pressures, as set by the spring constants of coil springs 50 and 51, to ensure optimal grease pressure at all phases of operation of the bearing. It may be appreciated that other configurations and bias levels may also be used as long as there is the same desired result. It can now be appreciated how the elements of lubrication vent block 24 provide a two-way flow of grease through the vent conduit 40. It can now be understood that the valve means of this preferred embodiment, comprising the valve conduit 42, floating piston 46, secondary piston 54, and coil springs 50 and 51, directs excess lubrication out of the bearing block to the vent means. The valve means also opens the flow path into the bearing block from the vent means when there is a negative pressure in the bearing block.

In this embodiment of the invention, the presence of the second valve that blocks vent conduit 40 when the bearing is in steady-state operation greatly reduces the risk that outside impurities will be introduced. As a result, unlike the first embodiment, in this embodiment it is not necessary that the vent line 32 and lubrication reservoir 34 form a closed system. A vent line 32 consisting of a short section or elbow of tubing terminating in an open end may be sufficient, or may not even be needed at all. To maintain a clean environment it is desirable to place a catch basin or some other simple receptacle under the open end, to catch any excess grease that drips out.

This embodiment of the invention may therefore be generally preferred, since it is more convenient on the factory floor to just run a vent line 32 from the lubrication vent block 24 to an ordinary bucket or catch basin, rather than to a more complex enclosed system. The two-valve embodiment is accordingly more versatile, since it maintains the integrity of a sealed system in all situations and can therefore be used equally with both stand-alone bearings or central lubrication systems.

It can now be appreciated that the lubrication vent block 24 manages the flow of lubrication in a bearing block by providing a predetermined and low-resistance path for excess lubrication to vent, and through which clean grease, rather than contaminants, may enter the bearing when necessary. This is cleaner and safer than the current system, where there is either a dangerous build-up of pressure, or undesirable venting through the high-resistance path of gaps in the seal. The present invention makes worry-free maintenance possible, since operators or centrally controlled systems can regularly inject fresh grease without concern that an excess of grease in the bearing will result in over-lubrication. Damage to the seal caused by inadvertent over-lubrication is similarly reduced. Ultimately, the reduction in excess heat and pressure and improvement in seal quality made possible by the present invention not only reduces the risk of bearing failure, but improves the efficiency of the running bearing, leading to productivity benefits as well.

It will be appreciated that the foregoing description is in respect of preferred embodiments of the invention and that various modifications are possible within the broad scope of the appended claims. Some of these modifications have been discussed above and others will be apparent to those skilled in the art. For instance, while the lubrication vent block 24 has been shown as an attachment to a traditional bearing block 10, it could also be constructed as an integral part of a bearing block. Another possibility is to use a single lubrication vent block 24 to manage the lubrication of a multiple number of bearing blocks 10. In that case the bearing block conduit 44 would connect with the threaded housing 20 of all the bearing blocks 10, in parallel. Also, the bearing blocks would be able to share a single lubrication reservoir 34.

I claim:

1. A lubrication vent block for use in managing lubrication in a lubricated device, said lubrication vent block comprising:

(a) a receiving means, to receive lubrication from an external source;

(b) a vent means, to vent lubrication from the lubricated device;

(c) a common conduit, fluidly connected to said receiving means and said vent means, to provide a path for lubrication to flow into and out of the lubricated device; and (d) a valve means, located between said common conduit and said vent and receiving means, for controlling the passage of lubrication through said lubrication vent block to said lubricated device, said valve means including a first biasing means to bias said valve means to a predetermined position, said valve means being sized and shaped to selectively block either said receiving means or said vent means;

wherein, upon lubrication being received by said receiving means, said valve means blocks said vent means and directs said lubrication through said common conduit to the lubricated device;

and wherein, upon an excess of lubrication arising in the lubricated device, said valve means blocks said receiving means and said excess lubrication passes through said common conduit to said vent means.

2. The lubrication vent block according to claim 1, further including a first connection means for releasably connecting the lubrication vent block to the lubricated device.

3. The lubrication vent block according to claim 1, wherein the receiving means includes a second connection means for releasably connecting the receiving means to an external source of lubricant.

4. The lubrication vent block according to claim 1, wherein the vent means includes a third connection means for releasably connecting the vent means to a lubrication reservoir.

5. The lubrication vent block according to claims 2, 3, or 4, wherein the first, second, and third connection means is a threaded housing.

6. The lubrication vent block according to claim 1, wherein the receiving means comprises a first conduit.

7. The lubrication vent block according to claim 1, wherein the vent means comprises a second conduit.

8. The lubrication vent block according to claim 1, wherein the receiving means comprises a first conduit and the vent means comprises a second conduit, and wherein the valve means includes a first valve member operating between said first and second conduit and having a first and second position, and wherein said first biasing means urges said first valve member to said first position.

9. The lubrication vent block according to claim 8, wherein, upon lubrication being charged to said receiving means, said first valve member is moveable from said first position to said second position, where said first valve member substantially closes the flow path through the second conduit, and in the absence of lubrication being charged to said receiving means, said first biasing means biases said first valve member to said first position, to substantially close the flow path through the first conduit and substantially open the flow path through said second conduit.

10. The lubrication vent block according to claim 9, wherein the valve means includes a second valve member having a neutral and at least one offset position, and a second biasing means for urging said second valve member to said neutral position.

11. The lubrication vent block according to claim 10, wherein said second valve member substantially closes said second conduit in said neutral position.

12. The lubrication vent block according to claim 11, wherein, upon the lubricated device containing an excess of lubrication, said second valve member is moveable from said neutral position to a first offset position, to substantially open a flow path through the second conduit.

13. The lubrication vent block according to claim 12, wherein said second valve member is moveable from said neutral position to a second offset position, to substantially open a flow path through the second conduit, by a negative pressure in said lubrication device.

14. The lubrication vent block according to claim 13, wherein said second biasing means is sized and shaped to permit ingress of lubrication into said lubricated device through said second conduit and said common conduit by said negative pressure.

15. The lubrication vent block according to claim 13, wherein lubrication is drawn through said vent means by said negative pressure.

16. The lubrication vent block according to claim 8, wherein the first biasing means is an elastically deformable element slidably connecting the first valve member to a fixed surface.

17. The lubrication vent block according to claim 16, wherein the fixed surface is removable.

18. The lubrication vent block according to claim 8, wherein the first valve member includes a bleed means to avoid hydraulic lock.

19. A lubrication vent block for use in managing lubrication in a lubricated device, said lubrication vent block comprising:

(a) a receiving means, comprising a first conduit, to receive lubrication from an external source;

(b) a vent means, comprising a second conduit, to vent lubrication from the lubricated device;

(c) a common conduit, fluidly connected to said receiving means and said vent means, to provide a path for lubrication to flow into and out of the lubricated device; and (d) a valve means, located between said common conduit and said vent and receiving means, for controlling the passage of lubrication through said lubrication vent block to said lubricated device, said valve means including a first biasing means to bias said valve means to a predetermined position, said valve means being sized and shaped to selectively block either said receiving means or said vent means;

wherein the lubrication vent block further includes a first threaded housing for releasably connecting the lubrication vent block to the lubricated device;

wherein the receiving means includes a second threaded housing for releasably connecting the receiving means to an external source of lubricant;

wherein the vent means includes a third threaded housing for releasably connecting the vent means to a lubrication reservoir;

wherein the valve means includes a valve member operating between said first and second conduit and having a first and second position, and a biasing means for urging said valve member to said first position;

wherein, upon lubrication being charged to said receiving means, said valve member is moveable from said first position to said second position, where said valve member substantially closes the flow path through the second conduit, and in the absence of lubrication being charged to said receiving means, said biasing means biases said valve member to said first position, to substantially close the flow path through the first conduit and substantially open the flow path through said second conduit, so that said valve means directs said lubrication through said first and common conduits to the lubricated device;

wherein, upon an excess of lubrication arising in the lubricated device, said valve means blocks said receiving means and said excess lubrication passes through said common conduit to said vent means;

and wherein lubrication is drawn through said vent means by a negative pressure in said lubrication device.

20. A method of managing lubrication in a lubricated device, which comprises:

providing a lubrication vent block having a receiving means to receive lubrication from an external source, a vent means to vent lubrication from the lubricated device, a common conduit, fluidly connected to said receiving means and said vent means, to provide a path for lubrication to flow into and out of the lubricated device; and a valve means, located between said common conduit and said vent and receiving means, for controlling the passage of lubrication through said lubrication vent block, said valve means including a first biasing means to bias said valve means to a predetermined position, said valve means being sized and shaped to selectively block either said receiving means or said vent means, and further including an output connector;

connecting the output connector to a lubrication input line of the lubricated device;

providing lubrication to the lubricated device by connecting an external lubrication source to the receiving means of said lubrication vent block and injecting lubrication under pressure, said valve means directing said lubrication to the lubricated device; and permitting excess lubrication received by the lubricated device to flow out of said lubricated device to said vent means as directed by said valve means.

21. The lubrication vent block according to claim 1, wherein said vent means is sized and shaped to permit ingress of lubrication into said lubricated device through said vent means, said ingress occurring upon a negative pressure arising in said lubrication device.

22. A lubrication vent block for use in managing lubrication in a lubricated device, said lubrication vent block comprising:

(a) a receiving means, to receive lubrication from an external source;

(b) a vent means, to vent lubrication from the lubricated device;

(c) a common conduit, fluidly connected to said receiving means and said vent means, to provide a path for lubrication to flow into and out of the lubricated device;

(d) a valve means, located between said common conduit and said vent and receiving means, for controlling the passage of lubrication through said lubrication vent block to said lubricated device, said valve means being sized and shaped to selectively block either said receiving means or said vent means; and (e) a lubrication reservoir, to receive lubrication vented from said vent means, said lubrication reservoir being connected to said vent means through a closed path;

wherein, upon lubrication being received by said receiving means, said valve means blocks said vent means and directs said lubrication through said common conduit to the lubricated device;

and wherein, upon an excess of lubrication arising in the lubrication device, said valve means blocks said receiving means and said excess lubrication passes through said common conduit to said vent means and said lubrication reservoir.

* * * * *